United States Patent [19]
Lin

[11] Patent Number: 5,609,081
[45] Date of Patent: Mar. 11, 1997

[54] PORTABLE ROUND-TUBE CUTTER

[76] Inventor: Shoei C. Lin, 318 8th Elr, Fu Sabng Rd., Sec, 3, Taichung, Taiwan

[21] Appl. No.: 413,455

[22] Filed: Mar. 30, 1995

[51] Int. Cl.$^6$ ..................................................... B23B 5/14
[52] U.S. Cl. ........................ 82/59; 82/72; 82/78; 82/101; 82/113; 83/631
[58] Field of Search ............................. 83/622, 618, 631, 83/464, 465, 623, 613, 629; 82/113, 59, 61, 62, 66, 67, 72–74, 78, 83, 101

[56] References Cited

U.S. PATENT DOCUMENTS

| 18,025 | 8/1857 | Taft | 83/629 |
|---|---|---|---|
| 723,358 | 3/1903 | Bradford | 82/67 |
| 1,318,177 | 10/1919 | Reed | 83/622 |
| 1,848,642 | 3/1932 | Micheli | 83/618 |
| 2,672,682 | 3/1954 | Studebaker et al. | 82/66 |
| 4,036,092 | 7/1977 | Kaltenbach | 83/631 |
| 4,130,034 | 12/1978 | Benoit | 82/113 |
| 4,468,995 | 9/1984 | Mireles-Saldivar | 83/629 |
| 4,483,223 | 11/1984 | Nall et al. | 82/113 |
| 4,750,393 | 6/1988 | Yamagata | 83/618 |
| 4,813,314 | 3/1989 | Kwech | 82/113 |
| 4,881,399 | 11/1989 | Bocharov et al. | 83/631 |

FOREIGN PATENT DOCUMENTS

| 135453 | 11/1902 | Germany | 83/629 |
|---|---|---|---|

Primary Examiner—Rinaldi I. Rada
Assistant Examiner—Allan M. Schrock
Attorney, Agent, or Firm—Bacon & Thomas

[57] ABSTRACT

A portable round tube cutter has a hollow central shaft through which passes a length of tubing to be cut. A transmission gear jacket is axially slidable along the shaft and rotates with the shaft. A tool chuck has a tubing cutter that is manually movable into the tubing to cut the tubing at a desired location. The tool is fed into and away from the tubing by a manually operable gear engaging the transmission gear jacket to cause axial movement of the jacket along the central shaft. Such axial movement rotates a transmission gear which, in turn, is engaged with a rack on the cutting tool mount to move the cutting tool either towards or away from the tubing. A clamping device is also included to clamp the length of tubing in the desired cutting position.

4 Claims, 6 Drawing Sheets

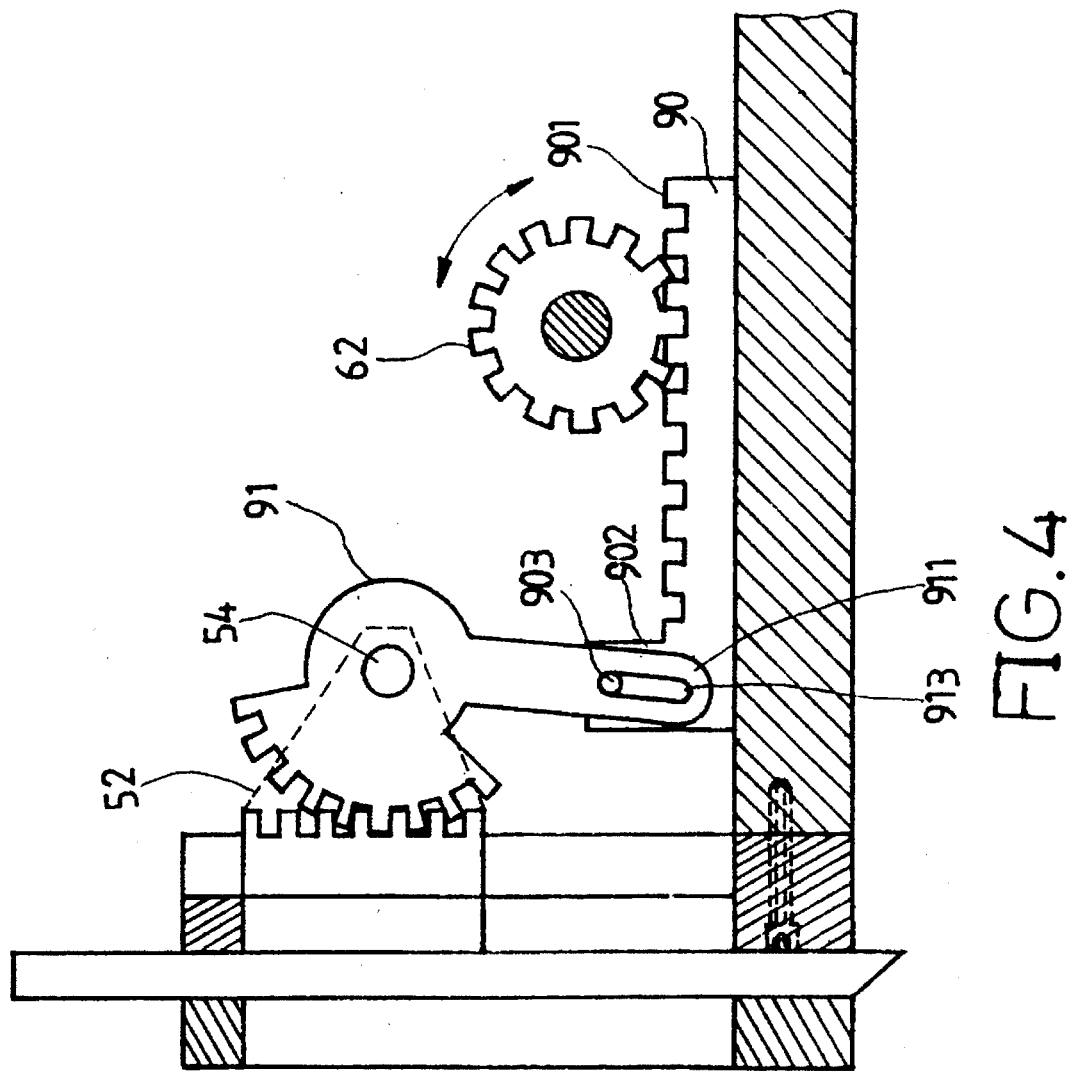

PORTABLE ROUND-TUBE CUTTER

BACKGROUND OF THE INVENTION

This invention concerns a newly designed cutting machine which is suitable for cutting different kinds of round tubes. The device is particularly designed as a portable type, so that it can easily be carried by hand, and can be used in different working places. Generally, tubing workers use saws or emery wheels to cut tubes or pipes which may be made of different materials, e.g. PVC, copper, aluminum, and iron. This old method will obviously result in the following inconvenience and defects:

1. The most commonly used tool, e.g. hack saw, takes a lot of exertion and requires a long cutting time.
2. The known devices are usually noisy and may even be somewhat dangerous during their operation.
3. The conventional tool is easily damaged. For examples, the blade of a saw is easy to break, and the emery wheel is easy to wear away, thus increasing the cutting cots.
4. Usually the conventional devices cannot make a smooth cut and therefore require more tedious work to improve the cut surface.
5. It is difficult to achieve a precise angle to the cut with the conventional devices, thereby causing a waste of material and low accuracy.
6. It is difficult to cut tubes with larger diameters or made of harder materials, with a suitable saw or emery wheel. Moreover, the saw or emery wheel suitable for large or hard tubes are very expensive, thereby increasing the cost of the work.
7. The commonly used emery wheels are quite heavy, are not easy to move, and occupy quite a large space.

SUMMARY OF THE INVENTION

The purpose of the new design according to the present invention is to provide a portable cutter for cutting of round tubes or pipes, which will improve the tubing quality in engineering projects. Moreover, this new invention will not only improve the defects described above, but will also offer the following merits:

1. It is portable, light and handy. The ease of carrying and movement will make the change of working sites no longer a difficult event.
2. While the cutter is being used, the cut and fillet will be finished in just one step. This will not only save time and labor, but will also make the cutting of tubing a more comfortable work.
3. It is suitable for cutting tubes of different materials including PVC, copper, aluminum, iron, and plastics. It is also suitable for cutting tubes of different thicknesses.
4. The procedure for cutting is fast and not noisy. The cut surface created by the device is smooth and glossy, and the location of the cut can be very accurate.
5. The cutter blade is exchangeable. There are single and multiple blades models according to the user's choice. The cutter blade is protected by a cover to prevent it from loosening and flying out.
6. The machine uses a powerful motor, which needs no heat dissipation and has a long working life. It can be adjusted to match the needs of different sizes and hardness of the materials, in order to make the best cut.
7. The machine fixes tubes to be cut with a cylinder clamping unit, so as to not harm the material during the cutting.

BRIEF DESCRIPTION OF THE DRAWINGS

For a more detailed understanding of this new device, consider the illustrations as described below:

FIG. 4 is a side cross-sectional view showing an alternate embodiment of the feed mechanism.

DETAILED DESCRIPTION OF THE PREFERRED EMBODIMENTS

Figure 1:
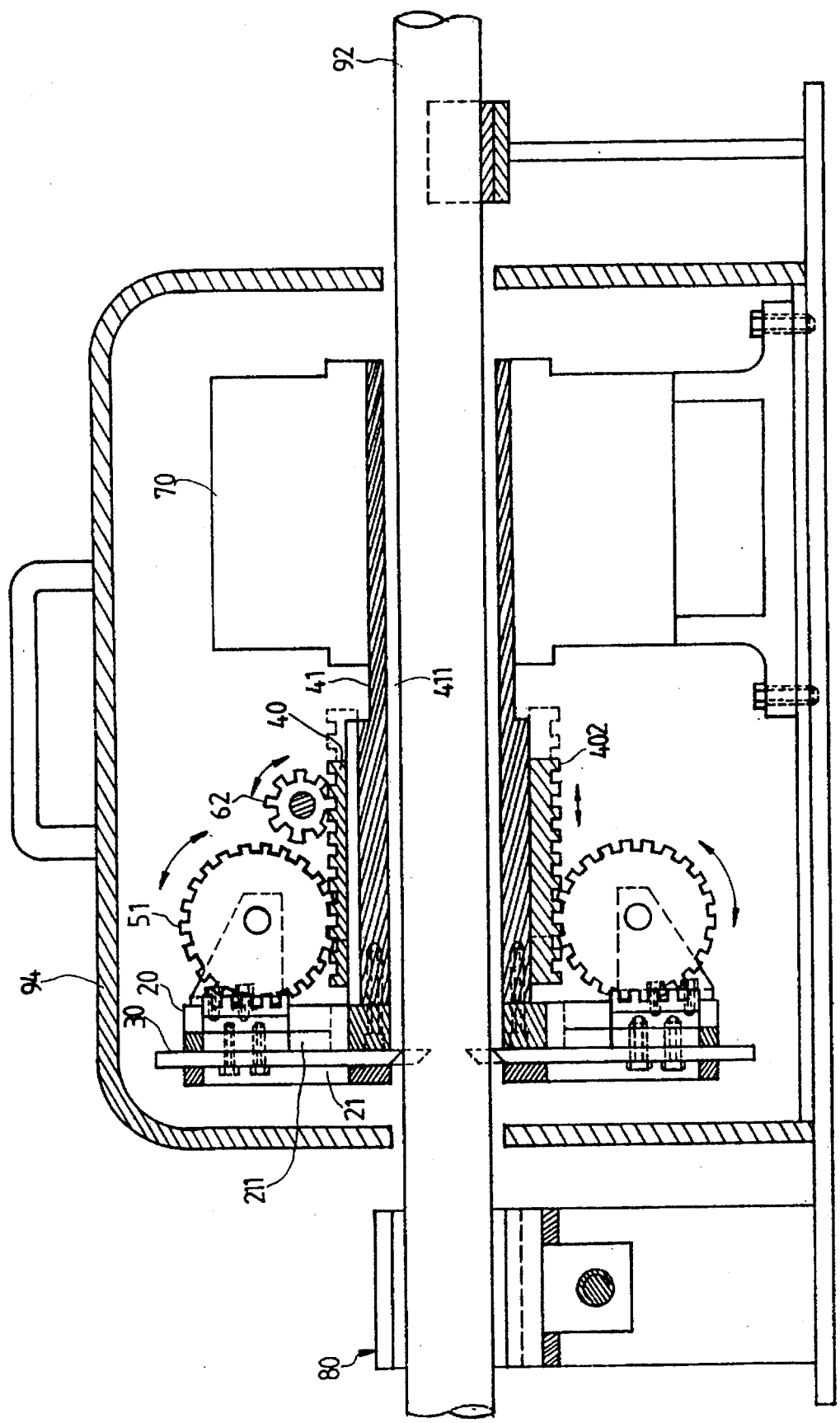
FIG. 1 is a side cross-sectional view illustrating the tube cutter according tot he present invention.
Figure 2:
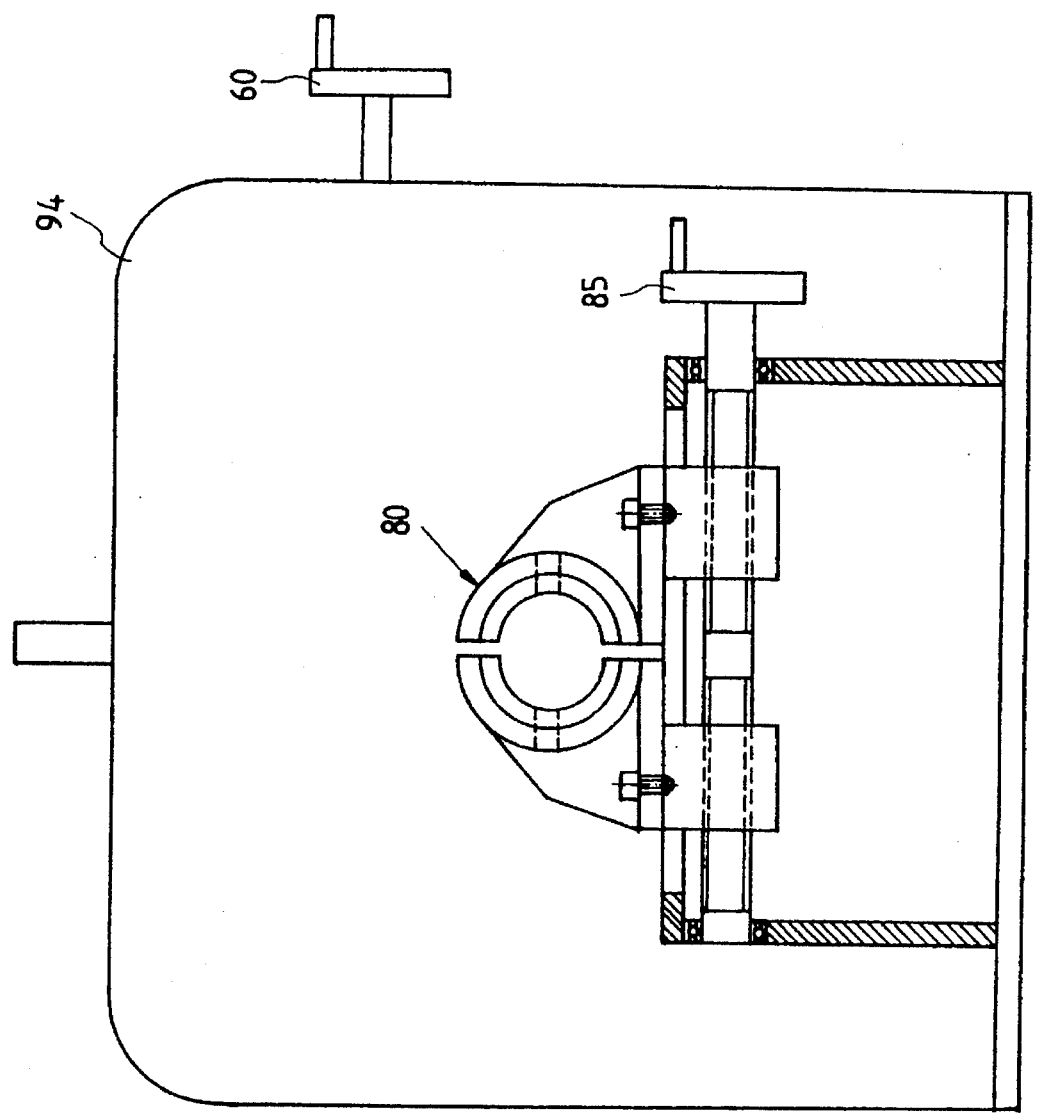
FIG. 2 is an end view of the device of FIG. 1.

FIG. 1 shows a cross-sectional view of the portable round-tube cutter according to the present invention. The tube (92) is sent in from the outside through the central hole (411), then goes inside along the central shaft (41) until the place where it is to be cut is aligned with the cutting blades (30). The hand wheel (85, see FIG. 2) is then revolved, so that the tube will be held by the clamping unit (80). At this point in time, the machine can be turned on and be ready to function. By revolving the hand wheel (60, see FIG. 3A), thereby moving the transmission gear jacket (40), the cutter blade (30) will be driven down into the tube (92) to make the cut. The hand wheels (60 & 85) are then revolved backward, in order to remove the tube from the device.

Figure 3A:
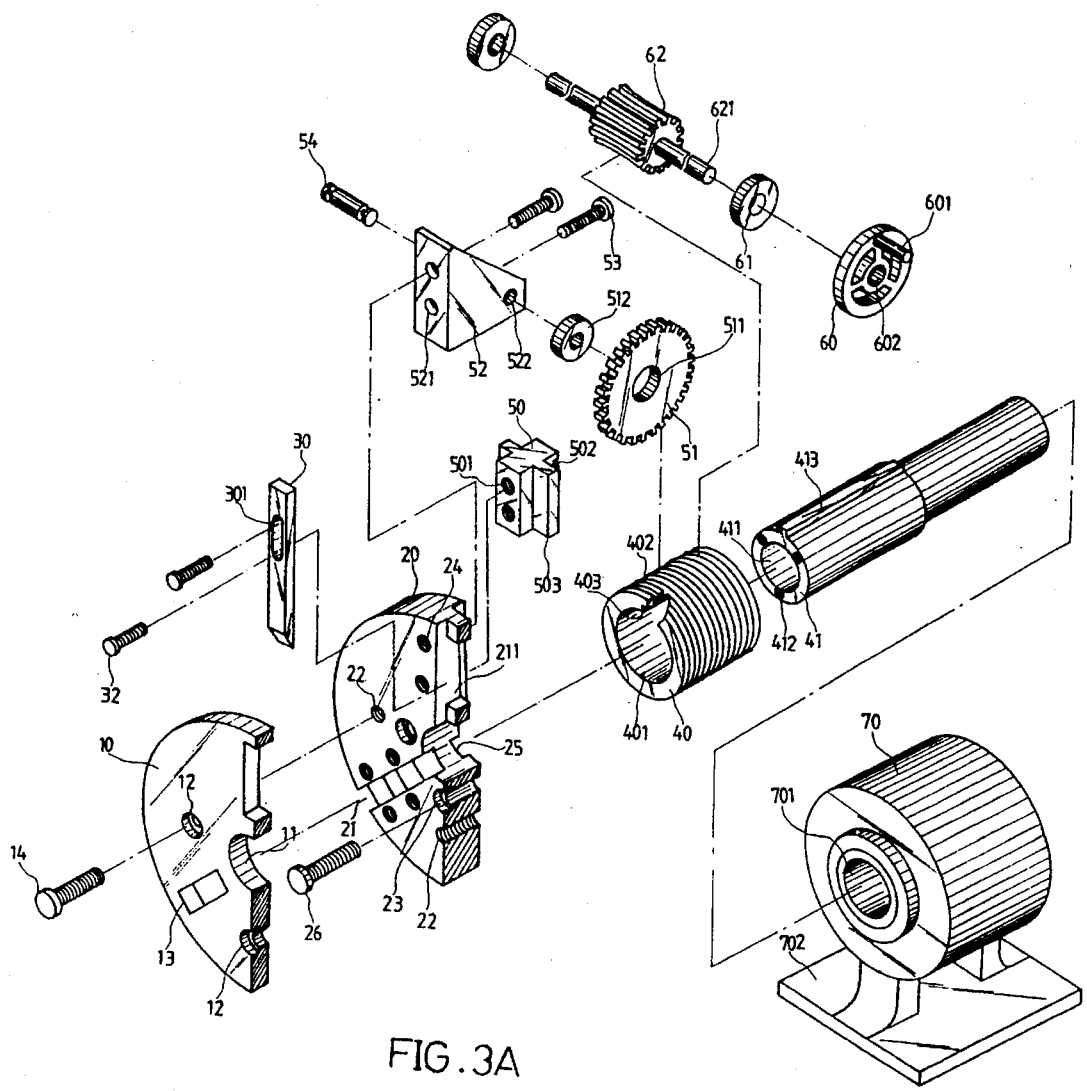
FIG. 3A is an exploded perspective view of the drive and feed mechanism of the present invention.

FIGS. 1 and 3A illustrate the feed mechanism of the device. The feed mechanism includes a central shaft (41) which is fixed inside a shaft hole (701) of motor (70). The rotation of the motor will cause the central shaft (41) to rotate. Since the design of the motor is not involved in this invention, its features are not described in this document. The feed mechanism also includes a transmission gear jacket (40), having a central shaft hole (401) with a keyway (403). The keyway (403) is engaged by key (413) to enable the rotation of gear jacket (40) with the central shaft (41). The transmission gear jacket (40) goes around the central shaft (41). The key (413) allows the transmission gear jacket (40) to move along the central shaft (41). Such a design assures a rotation of the transmission gear jacket (40) and the central shaft (41). The function regulated by the transmission gear (402), which is located on the outer part of the transmission gear jacket (40), forms the essential transmission system in this invention. The controlling system of this invention is formed by the outer hand wheel (60) and inner controlling gear (62). The controlling gear (62) is controlled by the hand wheel (60), and the controlling gear (62) then controls the movement of the transmission gear jacket (40) along the central shaft (41). Thus the transmission gear jacket (40) outside the central shaft (41) will move along the shaft (41). A horizontal shaft (621) extends through the controlling gear (62) through the shaft bearing (61) on the cover (94) of the machine. The end of shaft (621) goes outside the cover (94) and is fixed in the hole (602) of the hand wheel (60). By revolving the handle (601) of the hand wheel (60), the user is able to make the transmission gear jacket (40) move backwards and forwards along the central shaft (41). A rotary chuck (20) is fixed to the screw hole (412) on an end of the central shaft (41) by screws (26) which extend through holes (23). A cutter blade trough (21) is formed on one side of the rotary chuck (20). On the other side of the chuck, a sliding block (50) is mounted in slot (211), so as to slide up and down in the slot. The cutter blade (30) is located in the cutter blade trough (21) and is attached by screw (32) penetrating the hole (302) to fix the cutter blade (30) into the screw hole (501) on the sliding block (50). Thus, the cutter blade (30) is attached to the trough of the rotary chuck (20) to slide linearly up and down with the sliding block (50). There are convex edges (503) on both sides of the sliding block (50), therefore the block will closely much to the side of the rotary chuck (20). On the other end of the block (50) is the cog rack (502), connecting the block (50) to the transmission gear (51) such that the rotation of the transmission gear (51) will cause the up-and-down sliding of the sliding block (50) on the chuck (20). The attachment of transmission gear (51) is formed by pin (54) which penetrates through the fixing hole (522) and the shaft bearing (512) located in the center of the transmission gear (51). Thus the gear (51) will engage the transmission gear (402) on the outer part of gear jacket (40). When the gear jacket (40) moves along the central shaft (41), the transmission gear (51) will be rotated which will cause sliding block (5) to slide up and down on the chuck (20). A supporting bracket (52) is located on both sides of the transmission gear (51). There is a hole (521), and a screw (53) penetrates into the screw hole (24) on the rotary chuck (20) to attach the transmission gear (51). A protective plate (10) is affixed to the front of the rotary chuck (20). The protective plate (10) is fixed with screw (14), which penetrates into the hole (12) and the screw hole (22) on the rotary chuck (20). This hides the cutter blade (30) inside. The holes (13) and (301) on the protective plates (10) and cutting blade (30) respectively, are aligned with each other to enable the user to adjust the position of the cutter blade (30) by adjusting the screw (32) through the hole (13).

Figure 3B:
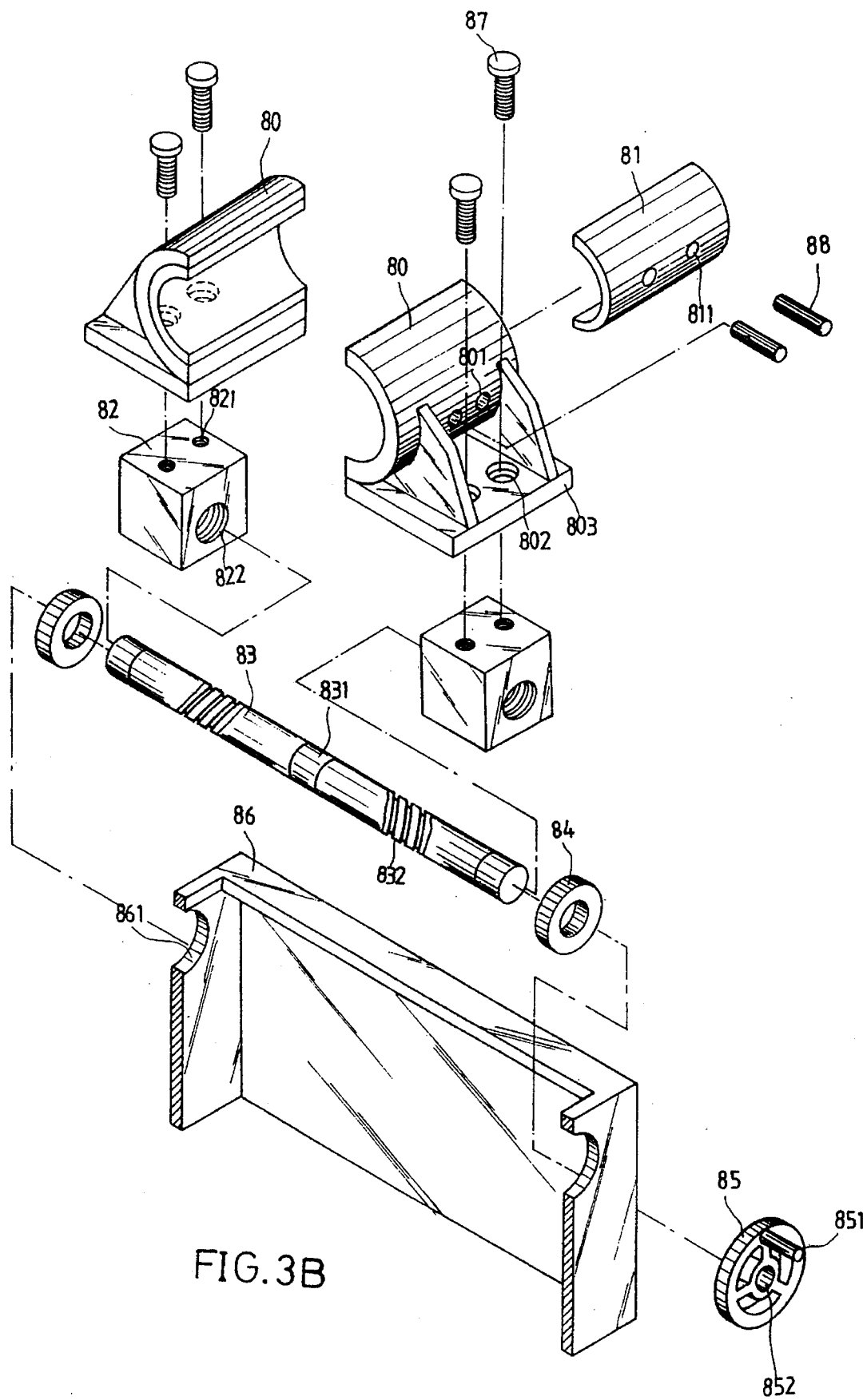
FIG. 3B is an exploded perspective view of the clamping mechanism according to the present invention.
Figure 5:
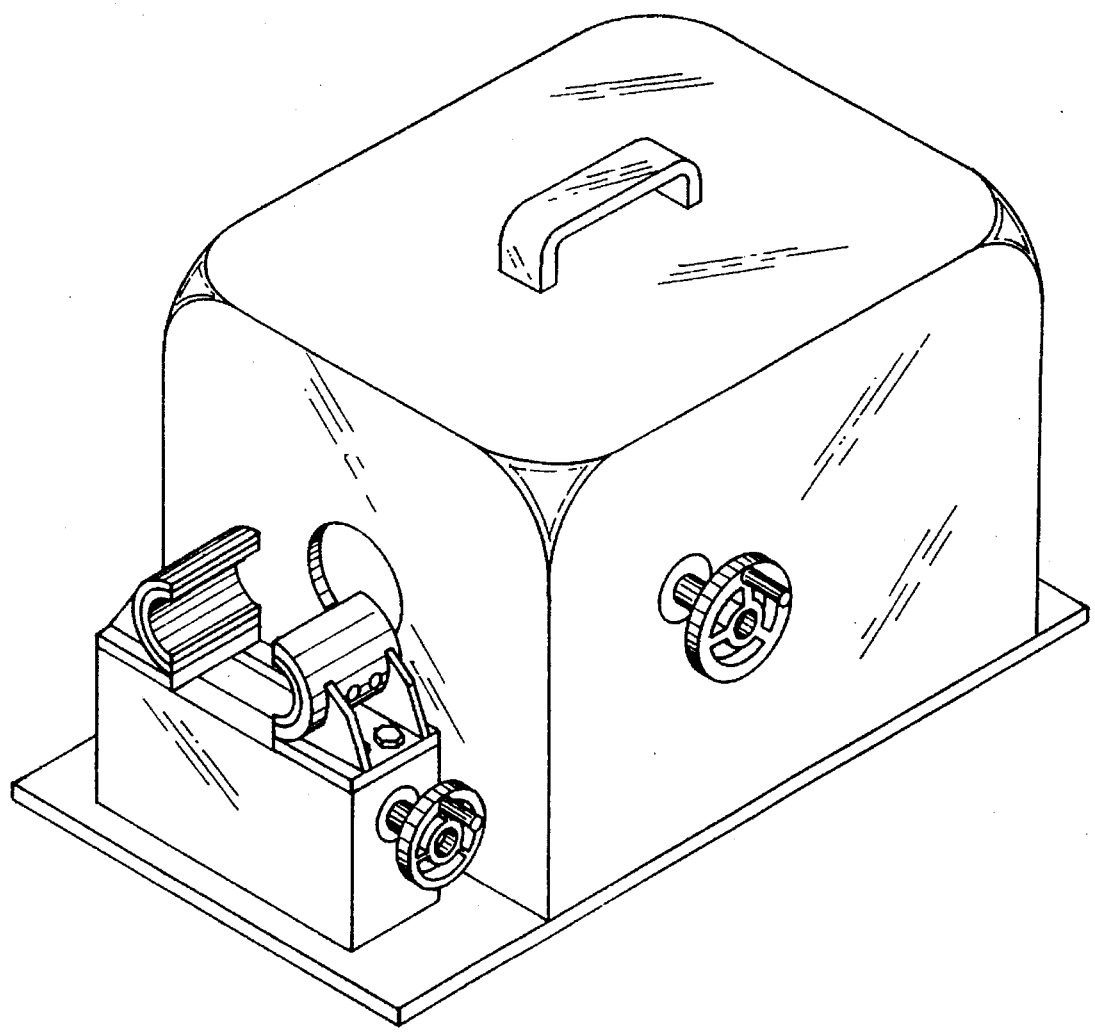
FIG. 5 is a perspective view of the cutting device according to the present invention.

FIG. 3B shows the parts of the clamping unit (80). The tube (92) needs to be held and fixed by the clamping unit (80), when it extends through the central shaft (41) and reaches the place where it is to be cut. Inside the clamping unit (80) is a clamping unit cushion (81), which is attached by removable pegs 88). The pegs (88) penetrate the holes (811) and (801), on the clamping unit (90) to make the connection. The cushion enables the clamping unit (80) to tightly hold tubes (92) of different sizes without damage to the tube. The bottom of the unit is fixed on sliding blocks (82) by the screws (87), which extend through holes (802) into holes (821) on the sliding block (82). The threaded holes (822) in the center of the sliding blocks (82) engage the screw thread (832) on the threaded screw shaft (83). The screw threads are on two ends opposite the center (831), and are right hand and left hand threads. Such a design enables the screw threaded shaft (83) to control the sliding of the sliding block (82), and to consequently open or close clamping unit (80). Screw threaded shaft (83) is supported by shaft bearings (84) on both sides of the clamping unit stand (86), enabling rotation of the shaft inside the clamping unit stand (86). One end of the shaft (83) reaches outside of the stand (86), and extends into hole (852) on the hand wheel (85). By revolving the handle (851) on the hand wheel (85), thereupon controlling the rotation of the screw threaded shaft (83), the user is able to direct the clipping unit (80) to clamp or to open. Thus the tube to be cut (92) can be held and fixed in the machine.

FIGS. 1 and 3A illustrate that the rotation of hand wheel (60) will drive the cutter blade (30) toward or away from the robe (92).

The running of the motor (70) rotates the central shaft (41). The central shaft (41) will then rotate the rotary chuck (20). Since the transmission gears (402) are parallel to each other, rotation of the central shaft (41) will not cause rotation of transmission gear (51) and controlling gear (62). On the contrary, the transmission gear jacket (40) and rotary chuck (20) will rotate with the central shaft (41). Thus, the rotating transmission gear jacket (40) can be controlled by the handle wheel (60), to move backwards and forwards along the central shaft (41) to control the rotation of transmission gear (51), and movement of the sliding block (50). The sliding block (50) in the penetrating hole (211) of the cutter blade through (21) will move towards the robe to cause the cutter blade 930) to be pressed down into the robe to make the cut. On the contrary, as the hand wheel (60) is revolved backwards, the sliding block (50) and cutter blade (30) will be directed by the gear to move upwards away from the robe. Then the hand wheel (85) will be revolved, to loosen the clamping unit (80) and release the robe (92). The processing of the cut is thereupon finished.

FIG. 4 shows another embodiment of the feed mechanism. In this embodiment, a crank handle gear (91) replaces the leading gear (51) as shown in FIG. 1. The crank handle gear (91) is also fixed on the supporting stand (52) by a pin (54) to make the crank handle gear (91) rotatable. The other end of the crank handle (911) extends into the space between the two wings (902) located on the front of the transmission gear jacket (90), and is fixed thereto by a pin, which penetrates through the hole (913). This pivots one end of the crank handle gear (91) to the transmission gear jacket (90). When the transmission gear jacket (90) moves backwards caused by revolving the hand wheel (60), the wing (902) on the front of the transmission gear jacket (90) will move the plug (903) backwards. Since the pin (903) moves horizontally in the hole (913) located at one end of the crank handle gear (91), the crank handle gear (91) will rotate, the pin (54) in the support bracket (52) will function as fulcrum for this rotation. Therefore the front end of the crank handle gear (91) will be moved down to simultaneously move the sliding block (50) and the cutter blade (30) down and make the cut. On the contrary, the transmission gear jacket (90) will move forwards when the hand wheel (60) is revolved in the opposite direction. Again, the crank handle gear (91) will direct the sliding block (50) and cutter blade (30) to move upwards. The processing of the cut is then finished.

Based on the descriptions presented above, it is clear that this portable round-tube cutter, which uses the gear transmission system to drive its cutter blade for tube cutting, is a new, creative, and advanced device, and is valuable to the industry. The foregoing description should not be used as a limitation and restriction of the scope in this patent. All the modifications derived from the principles included in this design will be regarded as within the scope of this patent.

What is claimed is:

1. A portable tubing cutter comprising:

a) an elongated, hollow control shaft configured to receive a length of tubing therethrough;

b) a generally annular transmission gear jacket mounted on the central shaft so as to rotate therewith and to slide along the central shaft, the transmission gear jacket having a plurality of parallel gear teeth extending around the periphery;

c) drive means connected to the central shaft to rotate the central shaft and the transmission gear jacket;

d) a tool chuck fixedly attached to the central shaft so as to rotate therewith;

e) a cutting tool;

f) tool feed means comprising:
  i) a sliding block attached to the cutting tool and slidably mounted on the tool chuck, the sliding block having a gear rack;
  ii) a transmission gear rotatably attached to the tool chuck and having a plurality of teeth engaging the plurality of teeth of the transmission gear jacket and the gear rack on the sliding block, and;
  iii) a control gear engaging the teeth of the transmission gear jacket and connected to a hand wheel such that rotation of the hand wheel in a first direction rotates the control gear, such rotation causing the transmission gear jacket to move along the central shaft, such movement causing the rotation of the transmission gear which, in turn, causes movement of the sliding block and cutting tool towards the length of tubing while rotation of the hand wheel in a second direction causes the cutting tool to move away from the length of the tubing; and, g) tube clamping means to hold the length of tubing in a desired position during the cutting operation.

2. The portable cutting tool of claim 1 wherein the tube clamping means comprises:

a) a pair of clamping jaws configured to clamp tubing therebetween;

b) a rotatable clamping shaft having oppositely threaded end portions and a second hand wheel affixed thereto such that rotation of the hand wheel causes rotation of the clamping shaft; and, c) a support block threadingly engaging each oppositely threaded end portion and attached to a clamping jaw such that rotation of the second hand wheel in a first direction moves the clamping jaws toward each other and rotation of the second hand wheel in a second direction move the clamping member away from each other.

3. A portable cutting tool of claim 2 further comprising a clamping cushion removably attached to each clamping jaw.

4. A portable cutting tool of claim 2 further comprising a protective plate attached to the tool chuck so as to cover the cutting tool.

* * * * *